Figure 1:
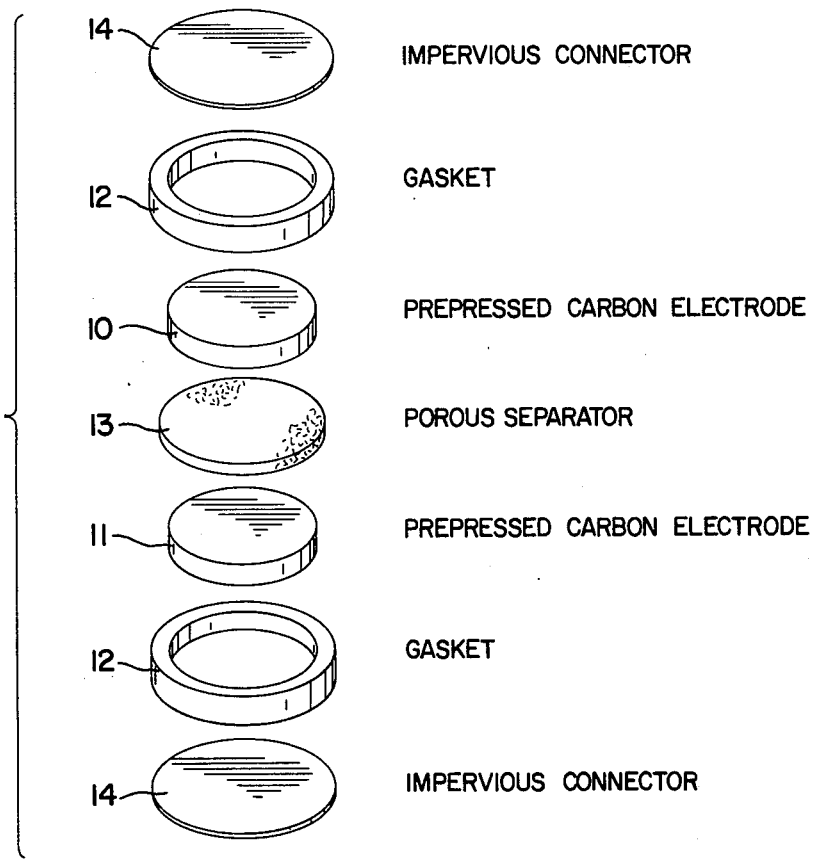

United States Patent [19]

Selover, Jr. et al.

[11] 4,014,730

[45] Mar. 29, 1977

[54] POLYMER DENSIFIED GRAPHITE SHEET AS IMPERVIOUS CONNECTOR FOR AN ELECTRICAL CAPACITOR

[75] Inventors: Theodore B. Selover, Jr., Shaker Heights; Donald L. Boos, Garfield Heights; Thomas H. Hacha, Willoughby, all of Ohio

[73] Assignee: Standard Oil Company, Cleveland, Ohio

[22] Filed: July 31, 1974

[21] Appl. No.: 493,278

Related U.S. Application Data

[63] Continuation-in-part of Ser. No. 385,435, Aug. 3, 1973, which is a continuation-in-part of Ser. No. 251,225, May 8, 1972, abandoned.

[52] U.S. Cl. .................................. 156/331; 156/60; 156/327; 156/333
[51] Int. Cl.² ....................................... B05D 7/24
[58] Field of Search ............ 427/81, 113, 115, 294, 427/370, 385, 80; 156/60, 327, 333, 331

[56] References Cited

UNITED STATES PATENTS

| 2,820,728 | 1/1958 | Burns, Jr. ........................ 427/113 |
| 2,962,386 | 11/1960 | Doll et al. ........................ 427/294 |
| 3,120,454 | 2/1964 | Bailey et al. ...................... 427/113 |
| 3,648,126 | 3/1972 | Boos et al. ....................... 317/230 |
| 3,656,027 | 4/1972 | Isley ............................... 317/230 |

FOREIGN PATENTS OR APPLICATIONS 1,090,566  3/1960  Germany ........................ 427/113

*Primary Examiner*—Cameron K. Weiffenbach
*Attorney, Agent, or Firm*—Herbert D. Knudsen; Evelyn R. Kosman; John F. Jones

[57] ABSTRACT

The connector of this invention comprises a thin, flexible sheet of graphite in which the pores and voids of the graphite are filled with a polymer to render the graphite impervious to the electrolyte of the capacitor.

5 Claims, 2 Drawing Figures

POLYMER DENSIFIED GRAPHITE SHEET AS IMPERVIOUS CONNECTOR FOR AN ELECTRICAL CAPACITOR

This is a continuation-in-part application of our co-pending patent application Ser. No. 385,435 filed Aug. 3, 1973 which in turn is a continuation-in-part of patent application Ser. No. 251,125 filed May 8, 1972, now abandoned.

This invention relates to an improved electrically-conductive, impervious connector for use in an electrical capacitor. More particularly, this invention relates to an intercell electron-conducting, ion-insulation connector that is chemically inert to the corrosive electrolyte of a capacitor operated at elevated temperatures, and is particularly useful in a capacitor having paste electrodes as described in U.S. Pat. Nos. 3,536,963, 3,634,736 and 3,656,027.

The connector which is the subject of the present invention comprises a thin, porous, flexible sheet of graphite which has been densified with a polymer. The term "densify" as employed in this invention refers to filling some of the pores and voids of the graphite sheet with a polymeric filler. This connector represents an improvement over that described in U.S. Pat. No. 3,656,027 which discloses an electron-conducting connector comprising a single metal or graphite substrate having an electrically-conductive, carbon filled polymer laminated to one side of the substrate. It is surprising in view of the prior art that the connector of the present invention composed of graphite sheet which has been impregnated with a non-conductive polymer would be sufficiently conducting to be suitable for the purpose intended here, and it is more surprising that a capacitor containing this connector actually displays a lower equivalent series resistance than one containing a connector of the prior art.

One of the main advantages associated with the connector of the present invention is its ease of maufacture and reproducibility. By eliminating a number of processing steps, it is more simple and less costly to fabricate. Further, it overcomes the problems associated with increased resistance due to poor bonding between the substrate and the polymer, and it contributes less resistance to the equivalent series resistance of the capacitor due to the direct contact between the carbon electrode and the highly conductive graphite sheet.

The connector of this invention is characterized as having chemical and thermal stability in the presence of a strong oxidizing acid at elevated temperatures, it meets the requirements for use in a capacitor that operates within the temperature range of about −40° to about 100° C, and it also sustains low liquid and gas permeability under the aforementioned conditions throughout the life of the capacitor.

The graphite sheet or foil comprising the connector of this invention may consist of any available thin, flexible, graphite sheet or foil having a thickness in the range of generally from about 0.3 to 10 mils. Sheet or foil having a thickness above this range generally contributes excessively to the resistance of the capacitor while thinner sheet or foil is usually too fragile for practical purposes.

Readily available forms of graphite sheet that are suitable for this purpose are graphite sheet prepared from expanded, compressed, graphite particles, and having anisotropic electrical properties, as described in U.S. Pat. No. 3,404,061, and wherein the anisotropy ratio, i.e., the ratio of the specific conductivity along the surface plane "A" to the specific conductivity along the perpendicular plane C is between 1 and 1000 at room temperature. The graphite sheet need not be limited to these types of graphite, however, and any electrically-conductive, flexible graphite sheet or foil falling within the desired range of thickness is operable.

The available flexible graphite sheet or foil possesses all of the desired properties for use as a chemically stable electrical connector with the exception of porosity. Untreated graphite sheet or foil is too porous for the purpose intended in this invention, and it acts as a wick which readily absorbs the electrolyte from the capacitor. In accordance with this invention, in order to render the graphite sheet impermeable, the graphite sheet is impregnated with a polymeric filler or sealant.

The polymers suitable as sealants for the connector of this invention are the natural rubbers and the synthetic rubbers obtained from ethylene, propylene, isobutylene, butadiene, isoprene, chloroprene, copolymers of styrene-butadiene, copolymers of isobutylene with various conjugated dienes wherein the amount of the diene does not exceed about 5 mole percent, as for example the butyl rubbers, chlorobutyl rubbers, chlorosulfonated polyethylene, vinylidene fluoride polymers, polybutadiene-urethane polymers, polyarylsulfones, ethylene-propylene terpolymers, nitrile rubbers, and Thiokol rubbers. Preferred are the butyl rubbers, and copolymers of vinylidene fluoride-hexafluoro-propylene and butadiene-urethane because of their chemical stability and their low permability.

It is essential that the polymeric sealant of this invention be in a fluid form so it can readily penetrate the pores and voids of the graphite. Particularly applicable are the low molecular weight, low viscosity, semi-liquid pre-polymers capable of curing in situ, such as the low molecular weight butyl rubbers. Also suitable are solvent solutions of the higher molecular weight elastomers. Suitable solvents include aliphatic, aromatic and naphthenic hydrocarbons, ketones and esters, and solvents such as for example, toluene, xylenes, cyclohexane, n-hexane, acetone, methyl ethyl ketone, ethyl acetate and amyl acetate are especially preferred. Solutions containing from about 10 to about 40 percent by weight of the elastomer in the appropriate solvent have been found to be satisfactory for incorporation into the graphite.

The polymeric sealants may be incorporated into the pores of the graphite sheet by any one of several methods known to those skilled in the art. For example, solvent solutions of an elastomer may be applied by vacuum impregnating, while more viscous polymers such as low molecular weight elastomers may be more readily applied to the surface of the graphite by spray coating, brush coating, and the like, covered with a second sheet of graphite, and the elastomer forced into the pores of the graphite and the excess exuded from between the two sheets of graphite by means of pressure, so that the ultimate composite comprises solely a laminate of two layers of elastomer-filled graphite sheet.

Where the sealant is an elastomer, it is advantageous to seal the elastomer in the pores of the graphite by curing in order to further improve impermeability and chemical stability. Curing of the elastomer-impregnated graphite may be accomplished by exposure to nuclear radiation, ultraviolet light, infrared radiation, steam, hot air, and preferably, vulcanization under pressure. In the vulcanizing treatment, the elastomer is mixed with the usual vulcanizing agents such as accelerators, antioxidants, antiozonants, waxes, stabilizers, and the like, before it is applied to the graphite sheet, and the entire graphite-rubber composite is subjected to a cure at elevated temperatures and pressures.

The pressure, temperature, and time suitable for vulcanizing the elastomer-filled graphite may vary with the cure time and flow characteristics of the particular elastomer used. It is also advantageous to preheat the elastomer-filled graphite without the application of any pressure to allow for gases, such as, water vapor and solvent to escape before vulcanizing.

Generally, the rubber-filled graphite may be cured at temperatures ranging from about room temperature to about 220° C and at pressures of from about 15 to about 15,000 psi, for a period of time ranging from about 1 minute to about 24 hours, depending on the temperature of cure and type of polymer employed. For example, an elastomer may be cured at room temperature for a period of 24 hours. Preferably, curing is carried out by preheating the rubber-graphite composite to a temperature in the range of about 90° to 120° C, for a period of about 1 to 2 minutes and curing at a temperature in the range of 105° to 175° C, at a pressure of about 250 to 13,500 p.s.i. for one minute to 16 hours.

Figure 2:
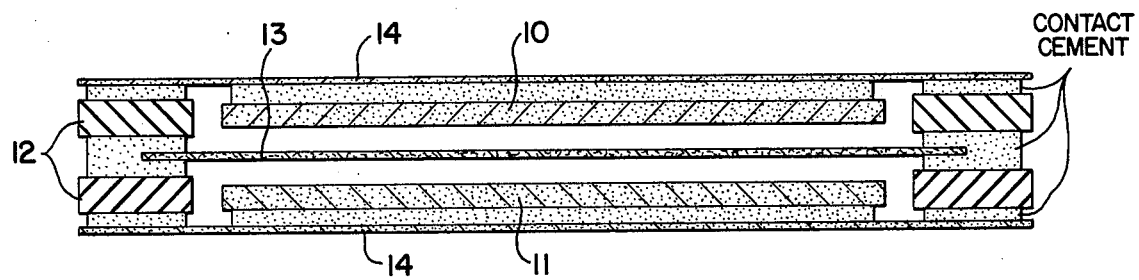

The invention will be more readily understood from the following detailed description taken in conjunction with the drawings wherein an exploded view of the components parts of a single cell electrical capacitor containing the impervious connector is shown in FIG. 1, and a cross sectional view of the assembled cell is shown in FIG. 2.

The cell shown is an example of a paste electrode capacitor which essentially comprises a pair of carbon paste electrodes 10, 11, a porous separator 13, and a pair of electron-conducting and ionic-insulating connectors 14. The primary functions of connector 14 are as a current collector and an inter-cell ionic insulator. While FIG. 2 illustrates one embodiment of the capacitor of this invention, in another preferred embodiment, however, the inner surfaces of connectors 14 are in direct contact with the outer surfaces of electrodes 10 and 11.

An annular means or a gasket 12 is preferably cemented or in some manner affixed to conducting member 14. Since paste electrodes 10 and 11 are not rigid masses but are to some extent flexible, the principle function of gasket 12 is to confirm the electrodes 10 and 11 and prevent the mass of the electrode method from seeping out. The gasket is constructed from an insulating material and is flexible to accommodate expansion and contraction of the electrode and flexing of the cell.

Separator 13 is generally made of a highly porous material which functions as an electronic insulator between the electrodes yet allows free and unobstructed movement to the ions in the electrolyte. The pores of the separator 13 must be enough to prevent contact between the opposing electrodes, since such a condition would result in a short circuit and consequent rapid depletion of the charges accumulated on the electrodes. Generally, conventional battery separators may be utilized, however, the separator can also be a non-porous ion-conducting films, such as an ion-exchange membrane. Prior to its use it is advantageous to saturate the separator with electrolyte. This can be accomplished by soaking the separator in the electrolyte for a period of time of up to about 15 minutes.

The carbon electrodes 10 and 11 consist of activated carbon particles in admixture with the electrolyte. Because electrical energy storage of a capacitor is apparently based on surface area, an increase in energy storage can be expected from an increase in surface area of carbon particles, as by activation. A detailed description of the electrical capacitor having carbon paste electrodes is more fully disclosed in U.S. Pat. No. 3,536,963.

Paste electrode 11 may also comprise a paste formed from the electrolyte in admixture with solid particles of boron carbide or a refractory hard metal carbide or boride wherein the metal may comprise tantalum, niobium, zirconium, tungsten and titanium, as more fully disclosed in U.S. Pat. No. 3,634,736. Also, paste electrode 11 may comprise a mixture of the electrolyte and a metal powder of copper, nickel, cadmium, zinc, iron, manganese, lead, magnesium, titanium, silver, cobalt, indium, selenium and tellurium, as disclosed in U.S. Pat. No. 3,648,126.

The electrolyte may consist of a highly conductive medium such as an aqueous solution of an acid, base or salt. In applications wherein high conductivity is required, 30 percent sulfuric acid is especially preferred. Non-aqueous electrolytes can also be used, and solutes such as metal salts of organic and inorganic acids, ammonium and quaternary ammonium salts, and the like may be incorporated in organic solvents.

In instances where one electrode may comprise a metal powder in admixture with the electrolyte, it is essential that the electrolyte be a non-corrosive media, such as a base, salt or non-aqueous media. In the assembly of the cell, the component parts are assembled in the order as shown in the accompanying FIGS. 1 and 2, and the cell is then compressed at a pressure sufficient to render the unit a coherent structure. Pressures in the range of about 240 psi have been found sufficient for this purpose.

EXAMPLE 1

The graphite connector utilized in this example was prepared as follows:

A. The butyl rubber filler was prepared by combining the following components in the amounts indicated:

|  | Parts by weight |
| --- | --- |
| Isobutylene-isoprene copolymer (Enjay, 4.2 mol% unsaturation, visc. aver. mol wt. 32,500) | 100 |
| White oil (Visc. at 100° F-51SSU, $d_{77}°$ F 0.82g/cc, free of unsaturation and aromatics) | 75 |
| zinc oxide | 5 |
| Stearic acid | 1 |
| 4A Molecular Sieves | 5 |
| Paraquinone dioxime | 3.5 |
| $Pb_3O_4$ | 8.0 |
| 2,2'-benzothiazyldisulfide | 5.0 |

The above components were mixed in a kneader with the resulting uniform blend being pourable at room temperature;

B. The liquid mixture was heated with stirring to 65° C and spread on the surface of a sheet of graphite, 5 mils thick, prepared from expanded, compressed graphite particles, as described in U.S. Pat. No. 3,404,061.

C. A second sheet of graphite was placed over the elastomer-coated graphite sheet obtained in (B) and the two sheets of graphite were compressed under light pressure to impregnate the graphite with rubber and to remove excess rubber from between the two graphite sheets. The composite thus formed was then cured between two sheets of degreased aluminum foil for 10 minutes at 165° C and at a pressure of 13,000 psi.

D. A cell was constructed as shown in FIG. 1, utilizing the above-prepared connector. The capacitor contained a pair of carbon paste electrodes, 1.125 inch in diameter, prepared from activated carbon (Nuchar Activated Carbon C-115, West Virginia Pulp and Paper Company), having a surface area of 700–950m$^2$/g; an electrolyte consisting of 30 percent aqueous sulfuric acid; an ionically conducting separator, 1.125 inch in diameter and 3 mils thick, prepared from an anisotropic membrane, the membrane having a resistivity in 40 percent KOH of 3.8 ohm-cm; and a pair of gaskets constructed from a copolymer of vinylidene fluoride and hexafluoropropylene, (Viton) having a thickness of 0.015 inch, an I.D. of ½ inch and an O.D. of 1.125 inch. The assembled cell was placed in a clamp and a 1.25 inch (I.D.) retaining ring slipped over the capacitor and cylinder assembly. The cell was compressed under a pressure of 240 psi.

The equivalent series resistance of the cell was measured at room temperature and was found to be 17 milliohms, and the leakage current of the cell measured 1.6 milliamperes. At 85° C the equivalent series resistance of the cell measured 14 milliohms and the leakage current 2.7 milliamperes.

EXAMPLE 2

A rubber-impregnated graphite connector was prepared according to the following procedure:

A. The rubber was prepared by mixing the following components in the amounts indicated, in a Banbury mixer at 71° C for 15 minutes:

|  | Parts by weight |
|---|---|
| Isobutylene-isoprene copolymer (Enjay, 2.1 – 2.5 mol% unsaturation, visc. aver. molecular wt. - 3.5 × 10$^5$) | 100 |
| Zinc oxide | 5 |
| Stearic acid | 2 |
| Paraffin wax | 2 |
| (B) The following components were added to the mixture obtained from step (A) during milling: | |
| 2-Mercaptobenzothiazole | 0.75 |
| Tetramethylthiuram disulfide | 1.25 |
| Sulfur | 2 |

The mixture was added to the banded rubber and thoroughly mixed and sheeted out through water cooled mill rolls;

C. The sheeted, uncured rubber obtained in step (B) was dissolved in toluene to a concentration of 7% by weight of rubber solids;

D. Flexible graphite foil, 5 mils thick using the same graphite sheet as employed in Example 1, was vacuum-impregnated with the toluene solution obtained from (C) and the excess liquid was removed from the surface of the graphite;

E. The impregnated graphite sheet was pressure-cured at a temperature of 165° C and a pressure of 4000 psi, for 30 minutes between degreased aluminum foil contact surfaces on open air platens;

F. A cell was constructed and assembled, as in Example 1, utilizing the above-prepared connectors. The equivalent series resistance and the leakage current of the cell measured at room temperature were in the same range as those of Example 1.

EXAMPLE 3

The electrical resistance of samples of butyl rubber (Butyl-365, Enjay Chemical Co.) containing various levels of extra conductive furnace black (Vulcan XC-72 Cabot Corp.) ranging from 0 to 100 parts of furnace black per hundred parts of rubber, by weight, were measured at room temperature. In addition to the carbon black, the rubber samples contained the following components in parts per 100 parts of rubber:

| Component | Parts by weight per 100 parts of rubber |
|---|---|
| Stearic acid | 2 |
| Zinc oxide | 5 |
| Paraffin | 2 |
| Sulfur | 2 |
| Mercaptobenzothiazole | 0.75 |
| Tetramethylthiuram disulfide | 1.25 |

After mixing, the above samples were sheeted out to a thickness of 10 mils on a differential roll mill. They were then vulcanized between two sheets of chrome-plated metal in a hydraulic press that was maintained at a temperature of 160° C, and a total force of 25,000 pounds for 20 minutes. The electrical resistance of These rubbers are shown in the following table.

Table I

| Parts carbon black in 100 parts butyl rubber, by weight | Electrical Resistance ohms in.$^2$/mil |
|---|---|
| 20 | 212,000 |
| 30 | 36,500 |
| 40 | 417 |
| 50 | 8.5 |
| 75 | 0.0047 |
| 100 | 0.002 |

These data indicate that the butyl rubber samples containing less than about 50 parts of carbon black per hundred parts of rubber are insulators, and therefore these data substantiate the unobviousness of the present invention. For it is unexpected that a connector, as one described in this invention utilizing non-conductive rubber as a filler for graphite, would exhibit the high conductivity shown in the examples.

We claim:

1. A process for preparing an electron-conducting, ion-insulating connector for use in an electrical capacitor comprising the following steps in sequence:

a. coating a single surface of a thin, flexible, porous, sheet of graphite having a thickness within the range of about 0.3 to 10 mils with a viscous paste of an elastomer containing a vulcanizing agent, said elastomer being a member selected from the group consisting of butyl rubber, copolymers of butadiene-urethane and vinylidene fluoride-hexafluoropropylene;

b. covering the elastomer-coated surface on the graphite with a second sheet of the graphite, forming a composite;
c. compressing the composite formed in (b) under sufficient pressure to impregnate the two sheets of graphite with elastomer and to exude any excess elastomer from therebetween so as to form a laminate of essentially the two sheets of elastomer-impregnated graphite; and
d. vulcanizing the elastomer-impregnated laminate obtained in (c) at a temperature of from about 25° to 220° C and a at a pessure of from about 15 to 15,000 psi.

2. The process of claim 1 wherein the thickness of the graphite sheet is within the range from about 0.3 mils to 10 mils.

3. The process of claim 1 wherein the elastomer is butyl rubber.

4. the process of claim 3 wherein the graphite sheet is composed of expanded, compressed graphite particles having anisotropic electrical properties.

5. The process of claim 4 wherein the elastomer-impregnated graphite sheet is curved by vulcanizing at a temperature within the range of 105° to 175° C and at a pressure of from 250 to 13,500 psi.

* * * * *

UNITED STATES PATENT OFFICE
CERTIFICATE OF CORRECTION

Patent No. 4,014,730      Dated March 29, 1977

Inventor(s) Theodore B. Selover, Jr. et al.

It is certified that error appears in the above-identified patent and that said Letters Patent are hereby corrected as shown below:

Column 1: Line 9, "251,125" should be -- 251,225 --

Column 1: Line 40, "maufacture" should be -- manufacture --

Column 2: Line 32, "permability" should be -- permeability --

Column 3: Line 61, after "must be" insert -- small --

Column 6: Line 37, "These" should be -- these --

Column 7: Line 12, after "and" delete "a"

Column 7: Line 12, "pessure" should be -- pressure --

Column 8: Line 10, "curved" should be -- cured --

Signed and Sealed this

*Thirty-first* Day of *January 1978*

[SEAL]

Attest:

RUTH C. MASON
*Attesting Officer*

LUTRELLE F. PARKER
*Acting Commissioner of Patents and Trademarks*